United States Patent
Tachino et al.

(10) Patent No.: US 7,436,495 B2
(45) Date of Patent: Oct. 14, 2008

(54) PHOTOELECTRIC SENSOR, RANGE IMAGE PRODUCING APPARATUS AND METHOD FOR PRODUCING RANGE DATA

(75) Inventors: Yoshihide Tachino, Kariya (JP); Hitoshi Yamada, Obu (JP); Ryoichi Sugawara, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/546,243

(22) Filed: Oct. 12, 2006

(65) Prior Publication Data

US 2007/0146682 A1 Jun. 28, 2007

(30) Foreign Application Priority Data

Dec. 19, 2005 (JP) .............................. 2005-365259

(51) Int. Cl.
*G01C 3/08* (2006.01)
(52) U.S. Cl. ..................................... 356/4.07; 356/4.01
(58) Field of Classification Search ................. 356/4.07
See application file for complete search history.

(56) References Cited

U.S. PATENT DOCUMENTS

| 5,705,807 A | 1/1998 | Throngnumchai et al. |
| 6,906,793 B2 | 6/2005 | Bamji et al. |
| 7,259,363 B2 * | 8/2007 | Deppe et al. ............ 250/215 R |
| 2004/0233416 A1 * | 11/2004 | Doemens et al. ........... 356/5.01 |
| 2005/0162638 A1 * | 7/2005 | Suzuki et al. ............. 356/4.04 |

FOREIGN PATENT DOCUMENTS

GB 2280025 A * 1/1995

* cited by examiner

*Primary Examiner*—Thomas H. Tarcza
*Assistant Examiner*—Timothy A Brainard
(74) *Attorney, Agent, or Firm*—Posz Law Group, PLC

(57) ABSTRACT

A method for producing a range data includes: irradiating a pulse light toward an object during a first time period; receiving a reflected pulse light during the first time period and a second time period; calculating a ratio between a first or second received light amount and a total received light amount, wherein the first received light amount is a light amount received during the first time period, wherein the second received light amount is a light amount received during the second time period, and wherein the total received light amount is a sum of the first and second received light amounts; and producing the range data based on the ratio.

10 Claims, 10 Drawing Sheets

PHOTOELECTRIC SENSOR, RANGE IMAGE PRODUCING APPARATUS AND METHOD FOR PRODUCING RANGE DATA

CROSS REFERENCE TO RELATED APPLICATION

This application is based on Japanese Patent Application No. 2005-365259 filed on Dec. 19, 2005, the disclosure of which is incorporated herein by reference.

FIELD OF THE INVENTION

The present invention relates to a photoelectric sensor, range image producing apparatus and a method for producing a range data.

BACKGROUND OF THE INVENTION

Conventionally, a range image producing apparatus has been proposed by which while pulse light is irradiated, reflection light from measurement objects, which are located within previously set measuring ranges, is received by photoelectric sensors having a plurality of pixels, and then, range images are produced from output data of the photoelectric sensors (refer to, for instance, US Patent Application Publication No. 2004-233416).

It should be understood that a range image corresponds to such an image that a distance up to an imaged object is represented by gradation (pixel values) of an image. Since such a range image is employed, distances up to a plurality of objects located within a wide range can be measured within one time.

In the range image producing apparatus, this apparatus is arranged as follows: That is, as shown in FIG. 11, while pulse light is irradiated, after a predetermined delay time "Tv (=n× ΔTv, n=0, 1, 2, 3, ... )" has elapsed from this pulse irradiation timing, such an operation that an integration window is opened (namely, light is exposed) only for such a time period equal to a pulse width of the irradiated pulse light so as to receive reflection light is repeatedly carried out a large number of times, while this delay time Tv is shifted by ΔTv. Here, one subject point is considered, D is constant, and To is constant. Then, such a delay time Tv that a received light amount (integrated voltage U) becomes maximum is detected as a propagation time "To," which is required to reciprocate the pulse light over a distance up to a measurement object which reflects thereon the irradiated pulse light. Then, a distance "d (=c×To/2)" measured up to the measurement object is calculated based upon this propagation time "To" and a velocity "c" of light.

In the conventional range image producing apparatus, for example, in such a case that distance resolution is selected to be several tens of centimeters to several meters, and a measuring range is selected to be approximately 100 meters, the change width ΔTv of the delay becomes on the order of 0.1 nanoseconds to 1 nanosecond, and a repetition time of measurements becomes on the order of several hundreds to several thousands times.

In other words, the conventional range image producing apparatus owns the following problems. That is, the very high precision control circuit is required so as to control the integration window within approximately 0.1 nanoseconds, and further, the large-scaled control circuit which processes a very large amount of measurement results is necessarily required, resulting in a large-scaled apparatus.

Moreover, in such a case that the change width ΔTv of the delay time Tv is decreased so as to improve the distance resolution, and/or the measuring range is widened so as to achieve higher performance, there is another problem that a total repetition number of measurements is further increased.

Also, the conventional range image producing apparatus has another problem. That is, since the irradiating operation of the pulse light must be repeated many times during a single measuring operation, this conventional apparatus is not suitably applied to such a requirement of a high real-time characteristic of the apparatus. Also, when an object to be measured is moved, a distance between this conventional apparatus and the object is changed every time the pulse light is irradiated, so that precision of measurement results is lowered.

SUMMARY OF THE INVENTION

In view of the above-described problem, it is an object of the present disclosure to provide a photoelectric sensor. It is another object of the present disclosure to provide a range image producing apparatus. It is further another object of the present disclosure to provide a method for producing a range data.

According to a first aspect of the present disclosure, a method for producing a range data includes: irradiating a pulse light toward an object during a first time period, which is a time for the pulse light to travel back and forth to a predetermined maximum measurement distance; receiving a reflected pulse light reflected by the object during the first time period and a second time period, wherein the second time period starts at an end of the first time period, and wherein the second time period is equal to or longer than the first time period; calculating a ratio between a first received light amount and a total received light amount or a ratio between a second received light amount and the total received light amount, wherein the first received light amount is a light amount of the reflected pulse light received during the first time period, wherein the second received light amount is a light amount of the reflected pulse light received during the second time period, and wherein the total received light amount is a sum of the first received light amount and the second received light amount; and producing the range data based on the ratio between the first received light amount and the total received light amount or the ratio between the second received light amount and the total received light amount, wherein the range data represents a distance to the object.

In the above method, the range data is easily obtained within short time, i.e., a real time. Accordingly, even when the object is a moving object, the range data is accurately obtained. Further, only by extending the first and second time periods, the maximum measurement distance can be easily increased. Furthermore, only by increasing detection accuracy of the reflected pulse light, distance resolution is improved without increasing the measurement time.

According to a second aspect of the present disclosure, a range image producing apparatus includes: a light emitting element for irradiating a pulse light toward a predetermined measurement range; an imaging device including a plurality of unit sensors, which are arranged in a two-dimensional plane, wherein each unit sensor includes a charge storage type photo electric conversion element for receiving a reflected pulse light reflected by an object and for converting the reflected pulse light to an electric charge, a first storage element for accumulating an output of the photo electric conversion element as a first pixel data and a second storage element for accumulating the output of the photo electric conversion element as a second pixel data; a controller, wherein the controller initializes the first and second storage elements to be a predetermined initial voltage, respectively, wherein the controller controls the light emitting element in such a manner that the light emitting element irradiates the pulse light during a first time period, which is a time for the pulse light to travel back and forth to a predetermined maximum measurement distance, wherein the controller controls the first storage element in such a manner that the first storage element accumulates the output of the photo electric conversion element during the first time period, and wherein the controller controls the second storage element in such a manner that the second storage element accumulates the output of the photo electric conversion element during a second time period, which starts at an end of the first time period and is equal to or longer than the first time period; and a range data producing element for producing a range data, which represents a distance between the object and the apparatus, wherein the range data is produced based on a ratio between the first pixel data and a total pixel data or a ratio between the second pixel data and the total pixel data, wherein the total pixel data is a sum of the first pixel data and the second pixel data. The range data producing element produces a range image having a pixel data of the range data. The above apparatus can detect the range data accurately and within short time. Further, the apparatus can detect the distance to the moving object accurately. Furthermore, the apparatus has high distance resolution.

According to a third aspect of the present disclosure, a photoelectric sensor includes: a plurality of unit sensors, which are arranged in a two-dimensional plane. Each unit sensor includes: a charge storage type photo electric conversion element for receiving a light and for converting the light to an electric charge; a first storage element for accumulating an output of the photo electric conversion element; a second storage element for accumulating the output of the photo electric conversion element; a current path for flowing the output of the photo electric conversion element; a connector for connecting the current path and the first or second storage element; and a charging/discharging switch for switching a flowing direction of a current in the current path to the photo electric conversion element. In the sensor, one of the first and second storage elements is selected, so that the one of the first and second storage elements is charged and/or discharged by using the output of the photo electric conversion element. Further, both of the first and second storage elements are selected, so that both of the first and second storage elements are charged and/or discharged by using the output of the photo electric conversion element. This sensor is suitably used for the range image producing apparatus having high accuracy of the range image. Further, when the normal image is obtained, both of the first and second storage elements are selected so that the first and second storage elements provide one storage element.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
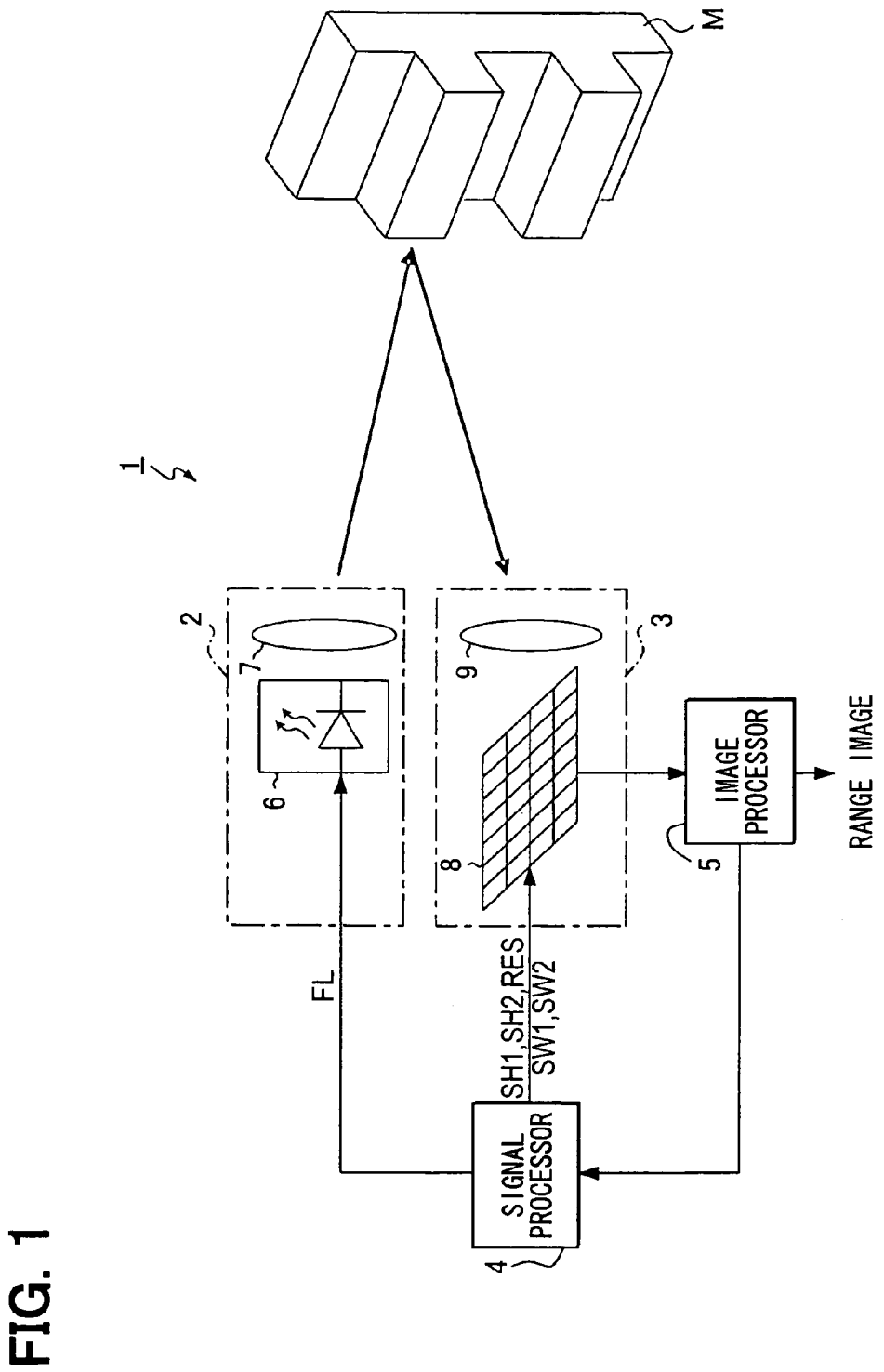
FIG. 1 is a block diagram showing a range image producing apparatus.

FIG. 1 is a block diagram for schematically indicating an entire arrangement of a range image producing apparatus 1 according to an example embodiment.

As shown in this drawing, the range image producing apparatus 1 is equipped with a light emitting unit 2, an imaging unit 3, a control signal producing unit 4 and a range image producing unit 5. The light emitting unit 2 emits pulse light in response to a light emission signal "FL." The imaging unit 3 images a measuring area which has been previously set in accordance with exposure signals SH1 and SH2, a reset signal RES, and switching signals SW1 and SW2. The control signal producing unit 4 produces various sorts of signals which control the light emitting unit 2 and the imaging unit 3. The range image producing unit 5 produces a range image based upon image data acquired from the imaging unit 3 by controlling timing and time periods of the various sorts of signals produced by the control signal producing unit 4.

Among these units, the light emitting unit 2 is arranged by a light emitting element 6 made of either a light emitting diode (LED) or a laser diode (LD), which emit near-infrared rays, and are driven by in response to the light emission signal FL. This light emitting unit 2 is also arranged by a diffusing lens 7 which diffuses radiation light of the light emitting element 6 over the previously set measuring area.

Also, the imaging unit 3 is equipped with a photoelectric sensor 8 and a collective lens 9. The photoelectric sensor 8 converts incident light into an electric signal. The collective lens 9 collects light propagated from an inner area of the measuring area, and enters the collected light into the photoelectric sensor 8.

Figure 2:
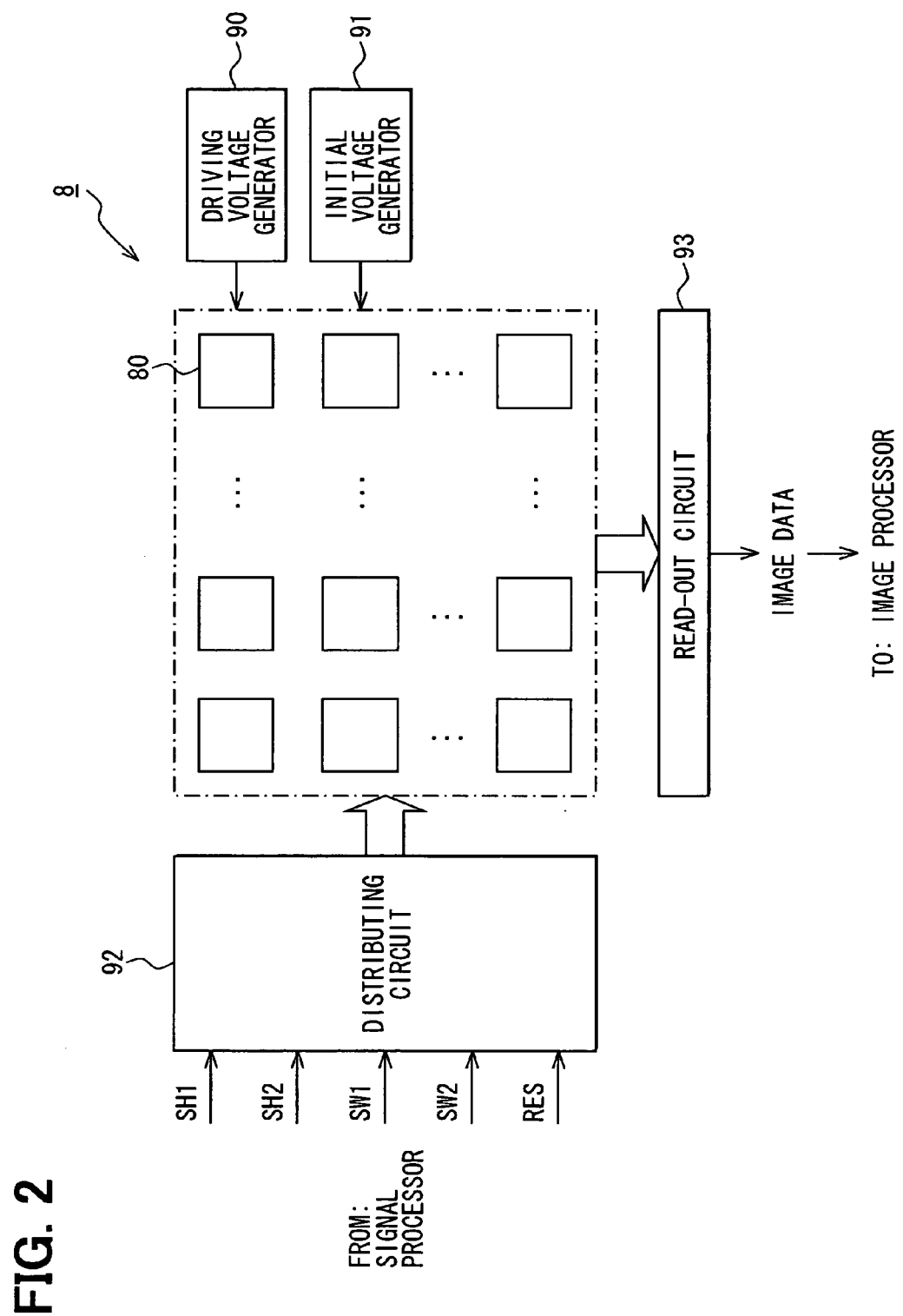
FIG. 2 is a block diagram showing an imaging unit in the apparatus.

Then, as shown in FIG. 2, the photoelectric sensor 8 is arranged by employing a plurality of unit sensors 80, a drive voltage generating circuit 90, an initial voltage generating circuit 91, a signal distributing circuit 92, and a read control circuit 93. In the unit sensors 80, photoelectric converting elements 81 (refer to FIG. 3) are provided in such a manner that light receiving planes of these photoelectric converting elements are arranged in a two-dimensional array shape. The initial voltage generating circuit 91 generates an initial voltage (namely, equal to ½ of drive voltage in this embodiment), which is used when these unit sensors 80 are initialized. The signal distributing circuit 92 distributes the exposure signals SH1 and SH2, the reset signal RES, and the switching signals SW1 and SW2 to each of the units sensors 80. The read control circuit 93 sequentially reads outputs of the respective unit sensors 80, and then, supplies the read sensor outputs to the range image producing unit 5.

Figure 3:
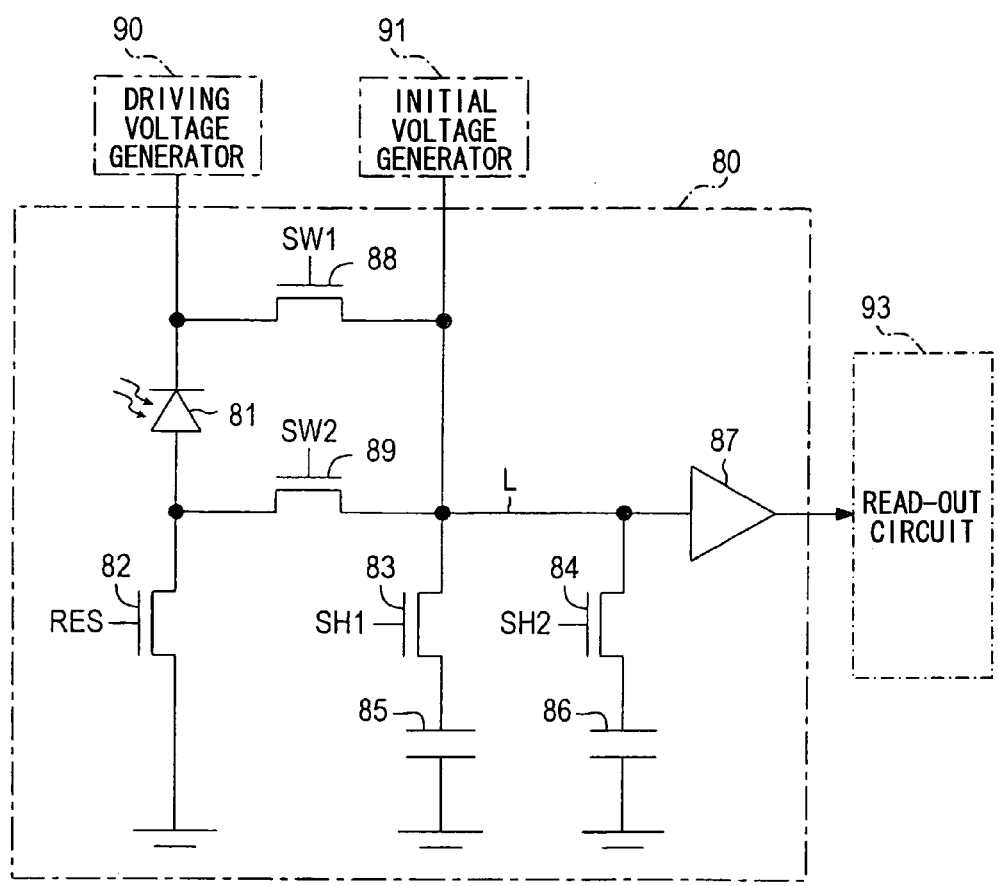
FIG. 3 is a circuit diagram showing a unit sensor in the apparatus.

In this case, FIG. 3 is a circuit diagram for indicating a structure of the unit sensor 80. As shown in FIG. 3, the unit sensor 80 is equipped with a photoelectric converting element 81 constructed of a photodiode. A cathode of this photodiode is connected to the drive voltage generating circuit 90, an anode thereof is grounded via a reset switch 82 which is turned ON and OFF in response to the reset signal RES, and the photodiode produces electric charges in response to received light strengths.

Also, the unit sensor 80 is equipped with a current path "L." The current path L is connected to the cathode of the photoelectric converting element 81 via a selecting switch 88 which is turned ON and OFF in response to the switching signal SW1, and also, is connected to the initial voltage generating circuit 91. The current path L is also connected to the anode of the photoelectric converting element 81 via another selecting switch 89 which is turned ON and OFF in response to the switching signal SW2.

Furthermore, the unit sensor 80 is equipped with a capacitor 85, another capacitor 86, and an amplifying circuit 87. One terminal of the capacitor 85 is connected to the current path L via a shutter switch 83 which is turned ON and OFF in response to the exposure signal SH1, and the other terminal thereof is grounded. One terminal of the capacitor 86 is connected to the current path L via another shutter switch 84 which is turned ON and OFF in response to the exposure signal SH2, and the other terminal thereof is grounded. An input of the amplifying circuit 87 is connected to the current path L, and an output thereof is connected to the read control circuit 93.

It should also be understood that as the photo diode, which constitutes the photoelectric converting element 81, such a photodiode having a PIN structure has been employed. A sensitivity of a photodiode having such a PIN structure is high, as compared with that of a normal photodiode constituted by a well-diffusion layer, since a thickness of an I layer (i.e., an insulation layer) corresponding to a light receiving region thereof is thicker. In particular, the photodiode having such a PIN structure is suitably employed so as to receive near-infrared light, which deeply enters into the I layer. Also, since the area of the I layer is wide and a capacity per unit area of this I layer is small, the photodiode having such a PIN structure may own the superior response characteristic.

Any of the reset switch 82, the shutter switches 83 and 84, the selecting switches 88 and 89 have been constructed of NMOS field-effect transistors. It is so assumed that any of these switches is turned ON when a signal is at an active level, and is turned OFF when a signal is at a non-active level in the below-mentioned descriptions.

The capacitors 85 and 86 are manufactured independently from junction capacitances owned by the photoelectric converting element 81, and are made of parallel flat plates formed on a semiconductor substrate by employing either a semiconductor material or a metal material. In other words, the entire arrangement has be formed in such a manner that electric charges generated in the photoelectric converting element 81 may be stored not only in the junction capacitance owned by this photoelectric converting element 81, but also in two pairs of these capacitors 85 and 86. Moreover, the capacitances of two pairs of these capacitors 85 and 86 have sufficiently larger values than the junction capacitance of the photoelectric converting element 81 having the voltage dependent characteristic. That is to say, both the electric charges which are stored in two pairs of these capacitors 85, 86, and in the junction capacitance, and also, an output voltage (pixel value) of the unit sensor 80 have been set to be such large values which may be regarded by that linear characteristics are owned.

As the above-explained amplifying circuit 87, a source follower circuit whose structure is simple and whose input impedance is high may be employed. Alternatively, another amplifying means having an equivalent effect to the source follower circuit may be employed.

In the unit sensor 80 arranged in the above-explained manner, when the switching signals SW1 and SW2 are at non-active levels and the initial voltage generating circuit 91 is turned ON (namely, initial voltage is generated), if the exposure signals SH1 and SH2 are brought into active levels, then the initial voltage is applied via the shutter switches 83 and 84 to the capacitors 85 and 86, so that the capacitors 85 and 86 are charged. Also, at this time, when the reset signal RES is brought into an active level, electric charges generated in the photoelectric converting element 81 are directly discharged.

Also, when the switching signals SW1 and SW2 are at non-active levels and the initial voltage generating circuit 91 is turned ON, if at least one of the exposure signals SH1 and SH2 is set to an active level, then voltages appeared across the capacitors 85 and 86 connected to the shutter switches 83 and 84 which are turned ON are amplified by the amplifying circuit 87, and then, the amplified voltages are applied to the read control circuit 93.

Also, if the drive voltage generating circuit 90 is turned ON, the initial voltage generating circuit 91 is turned OFF, at least one of the switching signal SW2 and the exposure signals SH1 and SH2 is brought into an active level, and other remaining signals are brought into non-active levels, then the capacitors 85 and 86 connected to the shutter switches 83 and 84 which are turned ON are charged by an output current of the photoelectric converting element 81, which flows via the selecting switch 89.

On the other hand, if the drive voltage generating circuit 90 and the initial voltage generating circuit 91 are turned OFF, at least one of the switching signal SW1, the reset signal RES, and the exposure signals SH1 and SH2 is brought into an active level, and other remaining signals are brought into non-active levels, then the capacitors 85 and 86 connected to the shutter switches 83 and 84 which are turned ON are charged by an output current of the photoelectric converting element 81, which flows via the selecting switch 88.

In other words, the unit sensor 80 has been arranged in such a manner that the capacitors 85 and 86 can be charged and discharged in a separate manner, or a unified manner, and also, the voltages appeared across the capacitors 85 and 86 can be read out in a separate manner, or a unified manner.

Next, the range image producing unit 5 is arranged by mainly employing a microcomputer which is constituted by a CPU, a ROM, and a RAM, and is well known in the technical field. Thus, the range image producing unit 5 executes a measuring process operation and a range image producing process operation, which will be explained later.

Figure 4:
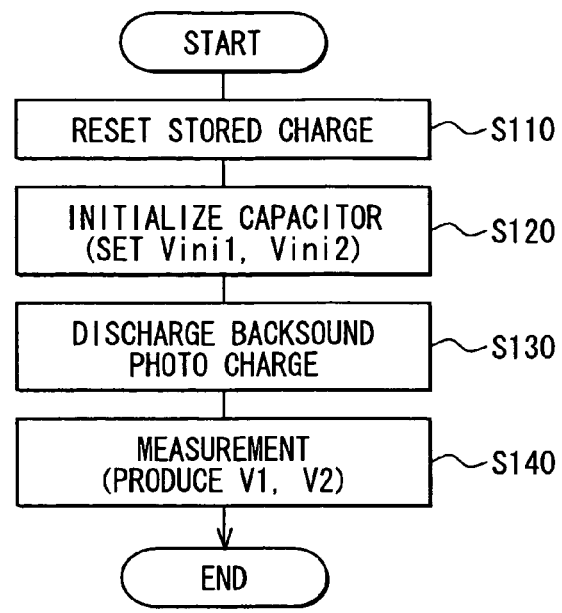
FIG. 4 is a flow chart showing a measurement process.
Figure 6:
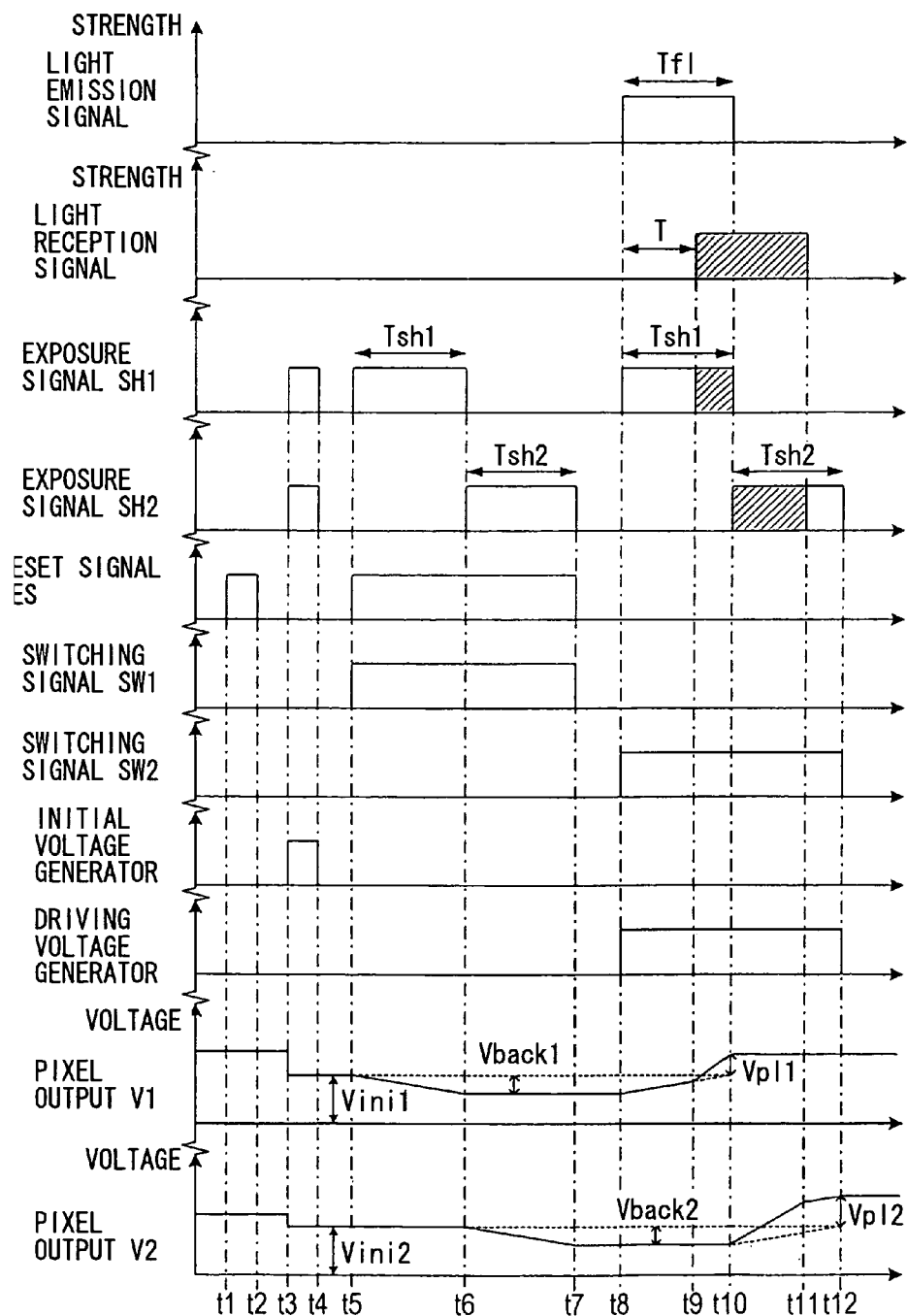
FIG. 6 is a timing chart showing operation of a control signal processing unit.

First, a description is made of such a measuring process operation with reference to a flow chart shown in FIG. 4 and a timing chart indicated in FIG. 6. In this measuring process operation, the range image producing unit 5 causes the control signal producing unit 4 to transmit various sorts of signals so as to obtain pixel output values V1 and V2 for every unit sensor 80 (namely, pixel).

As represented in FIG. 4 and FIG. 6, in the measuring process operation, since a reset instruction is firstly outputted to the control signal producing unit 4 (time instants "t1" to "t2"), electric charges stored in the photoelectric converting element 81 is reset (step S110). The reset instruction causes the reset signal RES to become an active level, and also other signals to become non-active levels.

Next, the initial voltage generating circuit 91 is turned ON so as to generate an initial voltage, and an initialization instruction is outputted to the control signal producing unit 4

(time instants "t3" to "t4"), so that the capacitors 85 and 86 are charged at the initial voltage (step S120). The initialization instruction brings the reset signal RES to a non-active level, and the exposure signals SH1 and SH2 to active levels. As a result, voltages appeared across the capacitors 85 and 86 are set to "Vini1" and "Vini2", respectively. It should also be noted that although the initial voltage has been set to be ½ of the drive voltage in this embodiment, the initial voltage need not be limited, but may be set to, for example, 0 V, or the like.

Next, the levels of all of these signals are once returned to the non-active levels, and the initial voltage generating circuit 91 is turned OFF. Thereafter, such a background light discharging instruction is outputted to the control signal producing unit 4, so that the electric charges stored in the capacitors 85 and 86 are sequentially discharged by an output current of the photoelectric converting element 81 in response to the background light (step S130). The background light discharging instruction causes the exposure signal SH1, the switching signal SW1, and the reset signal RES to become active levels only during a previously set first correction period "Tsh1" (time instants "t5" to "t6"), and subsequently causes the exposure signal SH2, the switching signal SW2, and the reset signal RES to become active levels only during a previously set second correction period "Tsh2" (time instants "t6" to "t7"). Since this discharging operation is performed, voltages appeared across the capacitors 85 and 86 become magnitudes obtained by lowering the initial voltages "Vini1" and "Vini2" by background light components "Vback1" and "Vback2", respectively.

Next, the levels of all of the signals are once returned to the non-active levels, and thereafter, such a measuring instruction is outputted to the control signal producing unit 4, so that the capacitors 85 and 86 are charged by an output current of the photoelectric converting element 81 in response to reflection light which contains the background light (step 140), and then, this measuring process operation is accomplished. This measuring instruction turns ON the drive voltage generating circuit 90 so as to generate a drive voltage, and causes the light emission signal FL to become an active level only during a previously set irradiation period "Tf1" (time instants "t8" to "t10"), and at the same, this measuring instruction causes the exposure signal SH1, and the switching signal SW2 to become active levels, and other signals to become non-active levels only during a previously set first exposure period "Tsh1" (=Tf1) (time instants t8 to t10), and subsequently this measuring instruction causes the exposure signal SH2, and the switching signal SW2 to become active levels, and other signals to become non-active levels only during a previously set second exposure period "Tsh2" (=Tf1) (time instants t10 to t12).

Pulse light irradiated from the light emitting unit 2 in response to this measuring instruction is reflected from an object, and light reflected from this object is received by the photoelectric sensor 8 of the imaging unit 3 (time instants t9 to t11). In this case, assuming now that a distance measured up to the object which reflects the pulse light is "Lbf" and a velocity of light is "Vc", the reflection light is received by being delayed by such a delay time (reciprocation time up to object) "T" with respect to the irradiated pulse light, while the reflection time T is expressed by the below-mentioned formula No. 1:

$$T = 2 \times Lbf / Vc \tag{F1}$$

Also, in this embodiment, assuming now that a maximum measuring distance is "Lmax", the range image producing apparatus 1 has been set in such a manner that a maximum reciprocating time "Tmax" (=2×Lmax/Vc) required to reciprocate the pulse light over this maximum measuring distance Lmax may become equal to the irradiation period Tf1, the first exposure period (first correction period) Tsh1, and the second exposure period (second correction period) Tsh2. This setting condition is required to achieve that if a distance up to the object which reflects the pulse light is shorter than the maximum measuring distance Lmax, then all of the reflection light components are stored in any one of the capacitors 85 and 86 within the first exposure period and the second exposure period (time instants t8 to t12).

In other words, assuming now that a strength of the reflection light is "Vrev" and a converting efficiency of the reflection on the photoelectric converting element 81 is "α", the voltage appeared across the capacitor 85 is increased by such an increased component Vu1 indicated in a formula No. 2 during the first exposure time period (time instants t8 to t10), whereas the voltage appeared across the capacitor 86 is increased by such an increased component "Vu2" indicated in a formula No. 3 during the second exposure time period (time instants t10 to t12):

$$Vu1 = Vback1 + \alpha \times Vrev \times (Tsh1 - T) / Tsh1 \tag{F2}$$

$$Vu2 = Vback2 + \alpha \times Vrev \times T / Tsh2 \tag{F3}$$

Then, assuming now that reflection light components except for background light components Vback1 and Vback2 within the increased components Vu1 and Vu2 are Vpl1 and Vpl2, a voltage appeared across the capacitor 85 obtained at an ending time (time instant t8) of the second exposure period, namely a pixel output value V1 may be expressed by a formula No. 4, whereas a voltage appeared across the capacitor 86, namely a pixel output value V2 may be expressed by a formula No. 5:

$$V1 = Vini1 + Vpl1 \tag{F4}$$

$$V2 = Vini2 + Vpl2 \tag{F5}$$

As can be understood from the above-explained formulae No. 4 and No. 5, the background light components Vback1 and Vback2 are canceled, and only the reflection light components Vpl1 and Vpl2 are stored in the capacitors 85 and 86.

Next, a range image producing process operation for producing a range image by employing the pixel output values V1 and V2 will now be explained in accordance with a flow chart shown in FIG. 5.

This range image producing process operation is initiated every time the previously explained measuring process operation is accomplished.

Figure 5:
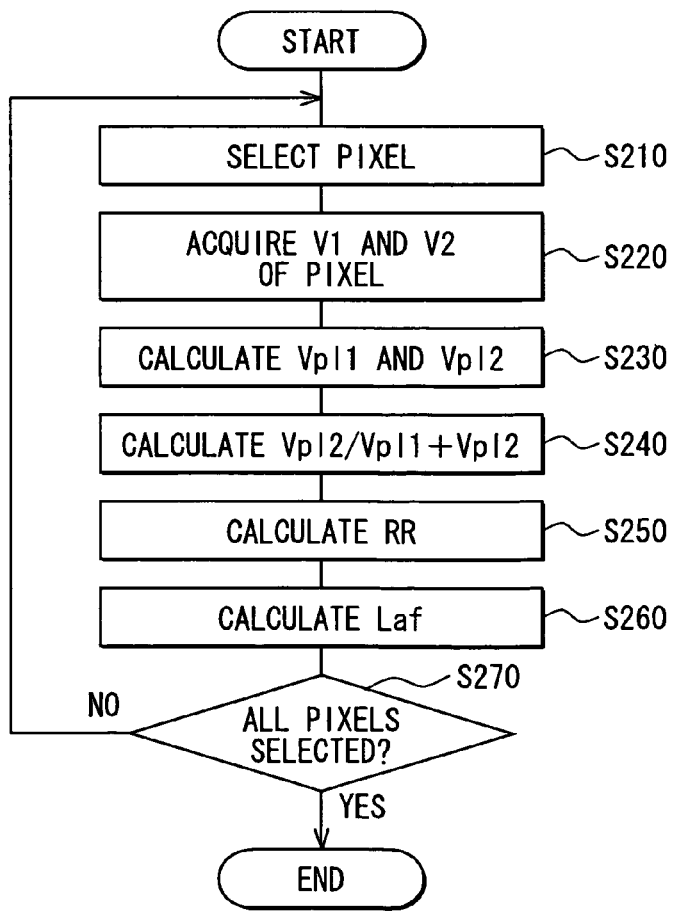
FIG. 5 is a flow chart showing a range image producing process.

Then, when this range image producing process operation is initiated, as shown in FIG. 5, any one of the plural pixels (namely, unit sensor 80), which constitute the photoelectric sensor 8, is firstly selected (step S210), and from this selected pixel, pixel output values V1 and V2 are acquired via the read control circuit 93 (step S220).

Since the initial voltages Vini1 and Vini2 are subtracted from the acquired pixel output values V1 and V2 respectively, the reflection light components Vpl1 and Vpl2 are calculated (step S230), and then, a strength ratio "R" is calculated based upon the calculated reflection light components Vpl1 and Vpl2 by employing the following formula No. 6 (step S240):

$$R = Vpl2 / (Vpl1 + Vpl2) \tag{F6}$$

Based upon the calculated strength ratio "R", a corrected strength ratio "RR (=T/Tmax)" is calculated by using a previously set conversion table, while the corrected strength ratio correctly represents a ratio of a delay time T of the reflection light with respect to the maximum reciprocating time Tmax (step S250). Then, the maximum measuring distance Lmax is multiplied by this calculated corrected strength ratio RR, so that range data "Laf (=Lmax×RR)" is calculated, and the calculated range data "Laf" is defined as the pixel value of the pixel selected in the step S210 (step S260).

Then, a judgment is made as to whether or not the above-explained process operations defined from the steps S210 to S260 have been executed with respect to all of the pixels (step S270). If there is an unprocessed pixel, then the process operation is returned to the previous step S210 in which the above-described process operations are repeatedly carried out. When the process operations have been accomplished with respect to all of the pixels, this range image producing process operation is completed. As a result, such a range image that the range data Laf is defined as the pixel value of each of the pixels is acquired.

As can be understood by substituting the formula indicative of the reflection light components Vpl1 and Vpl2 expressed in the above-explained formulae No. 2 and No. 3, the strength ratio "R" calculated by employing the above-described formula No. 6 in the previous step S240 represents the ratio (T/Tmax) of the delay time T of the refection light with respect to the maximum reciprocating time Tmax. Accordingly, the distance "Lbf(=Lmax×R)" measured up to the object which reflects thereon the pulse light can be simply calculated by multiplying the maximum measuring distance Lmax by this strength ratio R.

Figures 7A, 7B:
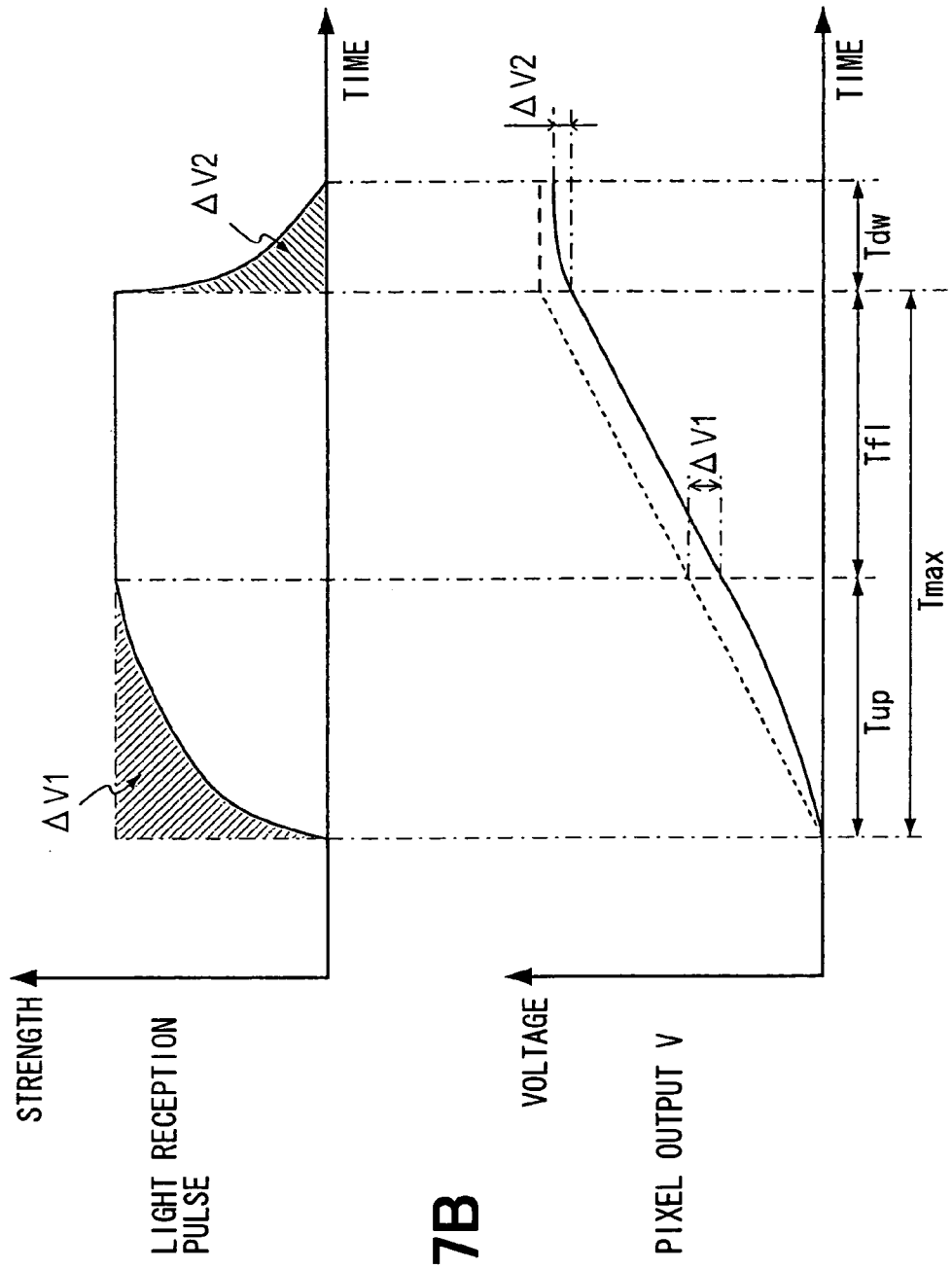
FIGS. 7A and 7B are graphs explaining error caused by waveform distortion of a pulse light.

However, in the above-explained formula No. 6, there is such an initial condition that the reflection light is such an ideal rectangular waveform having no rising time period "Tup" and no falling time period "Tdw." As indicated in FIGS. 7A and 7B, a waveform of actual reflection light owns a rising time period Tup and a falling time period Tdw on the order of 10 to 100 ns (nanoseconds) due to restrictions such as a parasitic capacitance of the light emitting element 6, and current driving capability of a power MOSFET which drives the light emitting element 6. Assuming now that an error (shortage from original value) caused by this rising time period Tup is $\Delta V1$, and an error (unnecessary added component) caused by the falling time period Tdw is $\Delta V2$, a corrected strength ratio RR defined by considering these errors $\Delta V1$ and $\Delta V2$ is expressed by the below-mentioned formula No. 7. It should be understood that this case indicates that the entire portion of the falling time period Tdw is contained in the second exposure period.

$$RR=(Vpl2-\Delta V2)/(Vpl1+Vpl2+\Delta V1-\Delta V2) \tag{F7}$$

That is to say, while a conversion table in which the strength ratio "R" corresponds to the corrected strength ratio "RR" has been previously formed based upon actually measured values, the corrected strength ratio RR is calculated by employing this conversion table in the step S250.

In this embodiment, the light emitting unit 2 corresponds to a light emitting means; the imaging unit 3 corresponds to an imaging means; the control signal producing unit 4 and the measuring process operation correspond to an imaging control means; the range image producing operation corresponds to a range data producing means; the step S250 corresponds to a correction means; the photoelectric converting element 81 corresponds to an photoelectric converting element; the capacitors 85 and 86 correspond to first and second storage elements; the shutter switches 83 and 84 correspond to storage element correcting means; and also, the reset switch 82 and the selecting switches 88, 89 correspond to charge/discharge switching means.

Also, the step S120 corresponds to an initializing control operation; the step S130 corresponds to a background light storage control operation; the process operation for outputting the light emission signal FL executed in the step S140 corresponds to an irradiation control operation; the process operation for outputting the exposure signal SH1 executed in the step S140 corresponds to a first pulse light storage control operation; and also, the process operation for outputting the exposure signal SH2 executed in the step S140 corresponds to a second pulse light storage control operation.

As previously described, in the range image producing apparatus 1, the pulse light is irradiated one time, and the reflection light of this irradiated pulse light is received two times by dividing the entire exposure period into the first exposure period and the second exposure period, so that the received light amounts (pixel output values) V1 and V2 are acquired within both the first and second exposure periods required to produce the range data Laf.

As a consequence, in accordance with the range image producing apparatus 1, the range data can be acquired in a simple manner and within a short time (real time), and also, such a very high precision time control operation as performed in the conventional apparatus is no longer required, so that the arrangement of the imaging unit 3 can be made simpler, and thus, the range image producing apparatus 1 (especially, photoelectric sensor 8) can be made compact and in light weight.

Also, since the pixel output values V1 and V2 can be acquired within the short time, the range image producing apparatus 1 can be applied to such a range image producing operation which requires a high frame rate, for instance, a distance measuring operation as to a high-speed moving object.

In addition, the range image producing apparatus 1 has been arranged in such a manner that the background light components Vback1 and Vback2 are removed from the pixel output values V1 and V2, since the exposing operation is carried out only during the first correction period and the second correction period, which are equal to the first exposure period and the second exposure period without irradiating the pulse light, and then, the electric charges produced based upon the background light are stored (namely, discharged) to the capacitors 85 and 86 in the reverse polarities with respect to the electric charges stored during the first and second exposure periods.

As a consequence, in accordance with the range image producing apparatus 1, the high precision image output values V1 and V2 which do not depend upon the background light can be obtained.

Also, in the range image producing apparatus 1, the strength ratio R is calculated from the pixel output values V1 and V2, and then, this strength ratio R is corrected in such a manner that the errors $\Delta V1$ and $\Delta V2$ may be compensated, while these errors are caused by waveform rounding occurred when the pulse light rises and falls. As a result, the following conditions have been set in this range image producing apparatus 1: That is, the corrected strength ratio RR and the distance up to the object may have the linear correspondence relationship, and the corrected strength ratio RR may express the ratio (RR=T/Tmax) of the delay time T of the reflection light with respect to the maximum reciprocating time Tmax.

As a consequence, in accordance with the range image producing apparatus 1, such a corrected strength ratio RR can be obtained, while this corrected strength ratio RR does not depend upon the strength of the reflection light, but may depend only upon the distance up to the object which reflects the pulse light. Thus, the range data Laf acquired by merely multiplying the maximum measuring distance Lmax by this corrected strength ratio RR can be directly handled as the distance up to the object.

Also, in accordance with the range image producing apparatus 1, since only the exposure period Tf1, namely the first exposure time Tsh1 and the second exposure time Tsh2 are prolonged, the maximum measuring distance Lmax can be enlarged. Further, since only the detection precision of the pixel output values V1 and V2 is increased, the distance resolution can be improved without sacrificing the real time characteristic.

Figure 8:
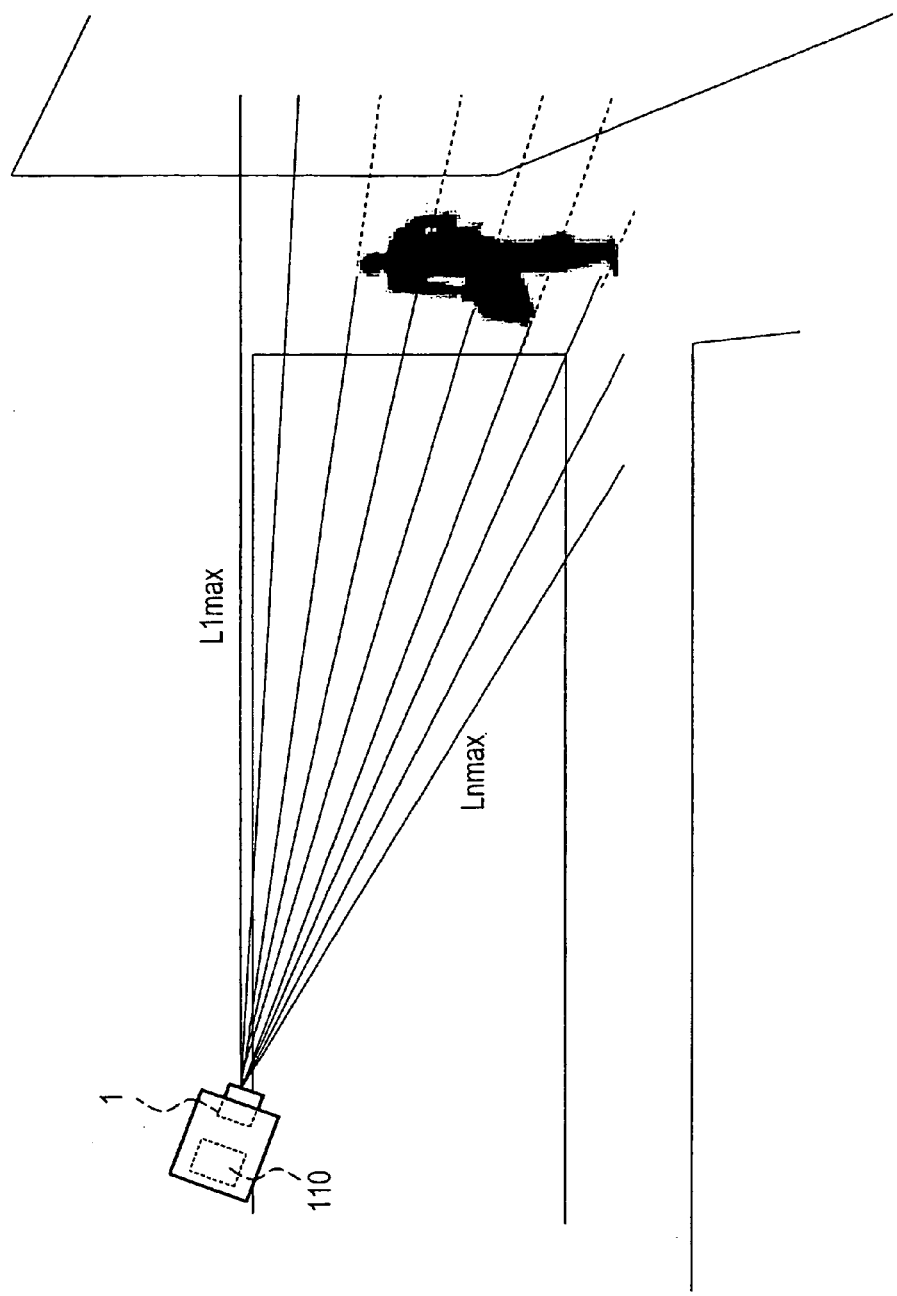
FIG. 8 is a schematic view explaining an operation of the range image producing apparatus for a monitoring camera.

It should also be noted that as shown in FIG. 8, for example, the range image producing apparatus 1 may be alternatively employed as a monitoring camera which is installed so as to detect an intruder etc.

In this alternative case, in the image processing unit 110 for processing the range image (range data Laf) produced by the range image producing apparatus 1, a grouping process operation is carried out based upon the distance of the range image by employing the range data Laf, and a process operation for specifying the intruder is carried out based upon a shape and a dimension of a grouped region.

Also, in the case that the monitoring camera (range image producing apparatus 1) is installed in an indoor area, a space where an object to be detected is present is defined by a wall, a ceiling, and a floor. As a result, such a maximum measuring distances Lmax may be set which are different from each other for individual pixels, or for a plurality of pixels (lines and regions).

In this case, the signal distributing circuit 92 must be arranged by that different signals can be supplied for the unit sensor 80, or the group of the unit sensors 80.

Figure 9:
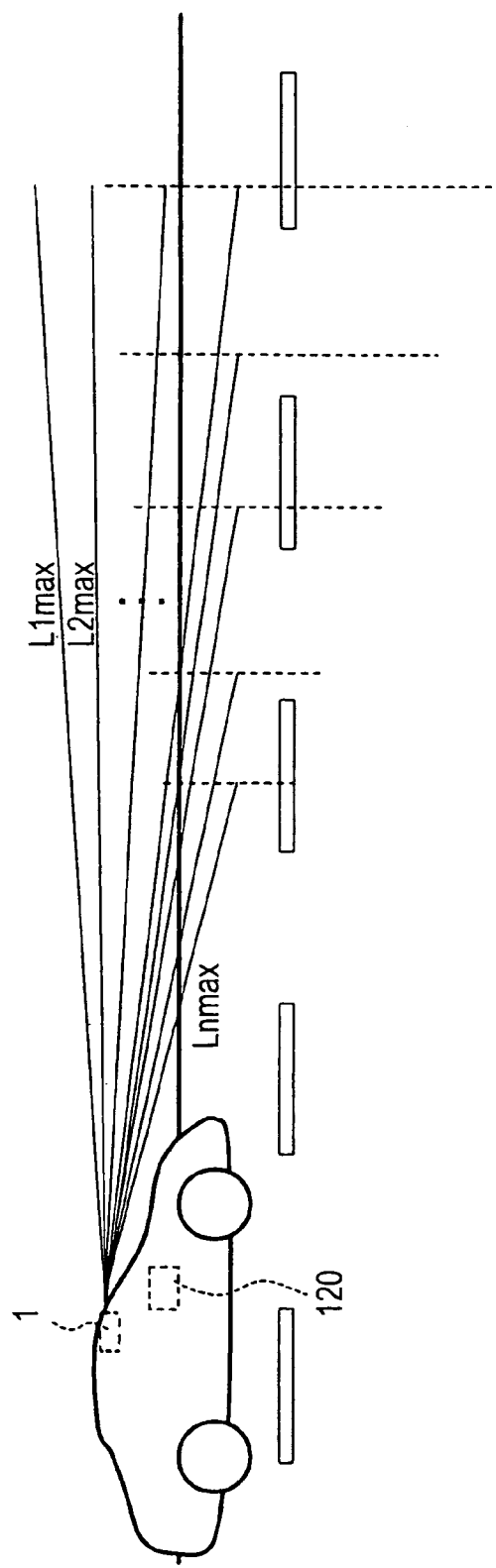
FIG. 9 is a schematic view explaining an operation of the range image producing apparatus for an in-vehicle camera.

Also, the range image producing apparatus 1 may be employed as, for example, as represented in FIG. 9, an on-vehicle camera capable of detecting an obstacle present in a traveling direction.

In this alternative case, in an image processing unit 120 for processing the range image (range data Laf) produced by the range image producing apparatus 1, a grouping process operation is carried out based upon the distance of the range image by employing the range data laf, and a process operation for specifying an object to be recognized (preceding vehicle, pedestrian, obstacle etc.) is carried out based upon a shape and a dimension of a grouped region.

It should also be understood that since such an object which reflects the pulse light is not always present within the maximum measuring distance Lmax in the on-vehicle camera, there are some possibilities that the reflection light cannot be received. As a consequence, in such a case, when the pixel output values V1 and V2 are equal to the initial voltages Vini1 and Vini2, the on-vehicle camera may interpret that no object is present within the maximum measuring distance Lmax.

Alternatively, as the pulse light irradiation method, as indicated in the drawing, maximum measuring distances "Limax" (symbol "i"=1, 2, ..., n) may be set for one line of a pixel. Also, there is no specific limitation as to a projection angle of pulse light. Accordingly, pulse beams may be focused onto one pulse beam, and this single pulse beam may be irradiated onto each of the pixels. Further, a pulse light beam may be alternatively widened along the horizontal direction so as to be irradiated one time.

As previously described, although one embodiment of the present invention has been described, the present invention is not limited only to the above-explained embodiment, but may be realized in various modes without departing from the technical scope and spirit of the present invention.

For instance, although the background light components Vback1 and Vback2 have been discharged before the first and second exposure periods in the above-explained embodiment, these background light components may be alternatively discharged after the first and second exposure periods.

Also, in the above embodiment, the discharging operation is carried out during the first and second correction periods, whereas the charging operation is carried out during the first and second exposure periods. Conversely, the charging operation may be carried out during the first and second correction periods, whereas the discharging operation may be carried out during the first and second exposure periods.

Figure 10:
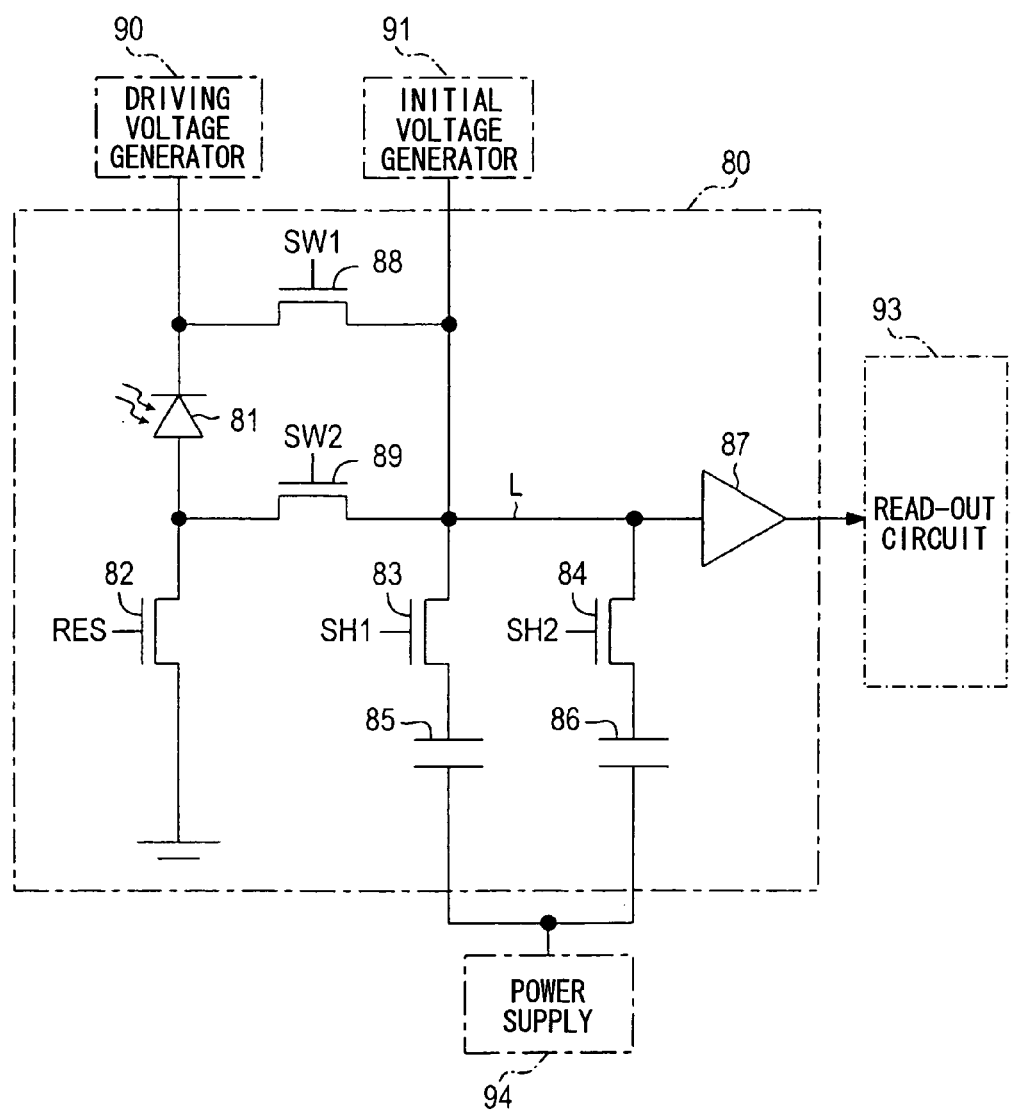
FIG. 10 is a circuit diagram showing another unit sensor.
Figure 11:
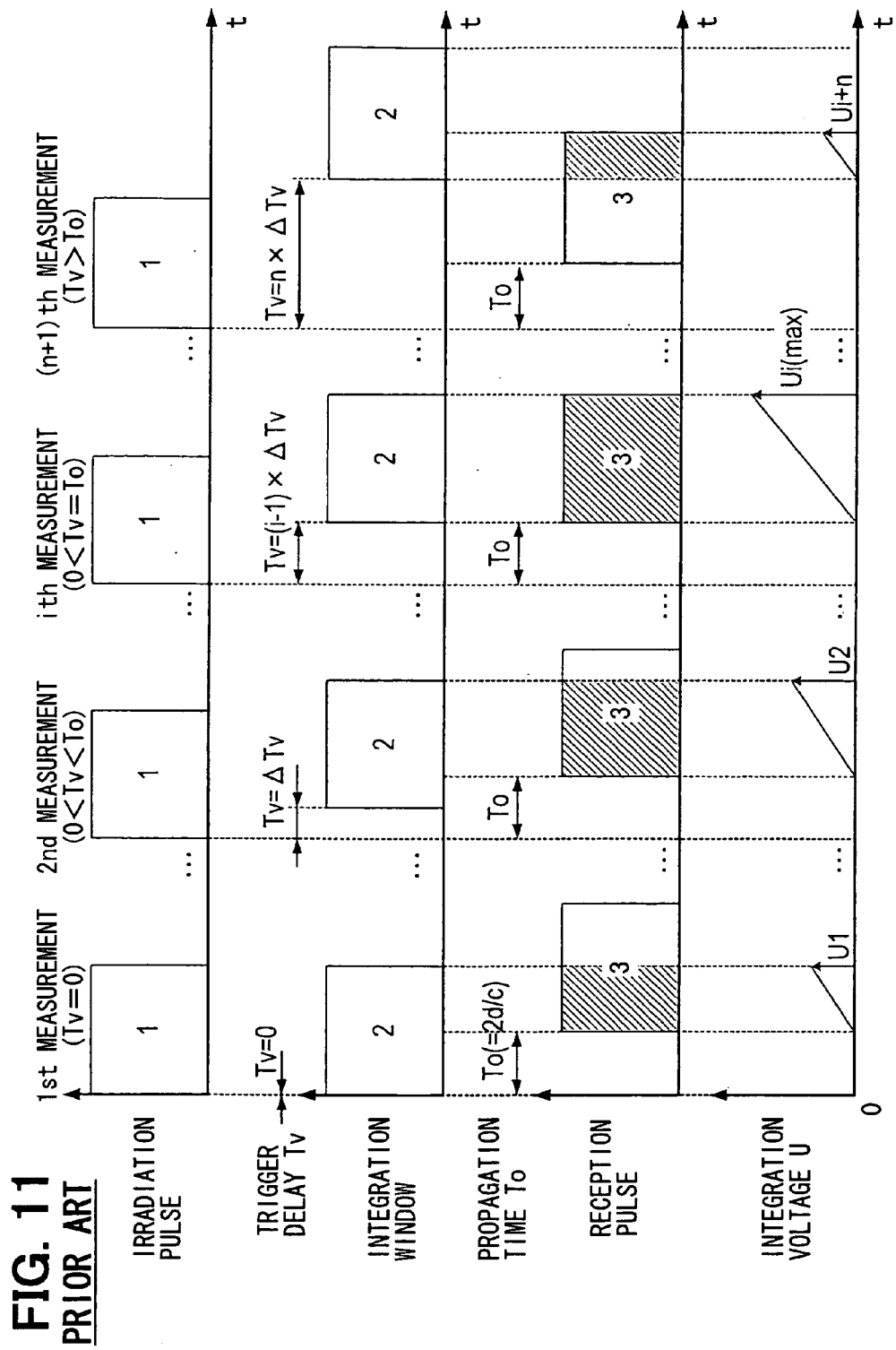
FIG. 11 is a timing chart showing an operation of a range image producing apparatus according to a prior art.

In this alternative case, for example, as shown in FIG. 10, the unit sensor 80 may be arranged in such a manner that the capacitors 85 and 86 are not connected to the ground line, but are connected to a power supply 94.

Also, in the above-described embodiment, the corrected strength ratio RR has been calculated from the strength ratio R. Alternatively, in such a case that a rising time period and a falling time period are negligibly short, and the precision of the range data Laf may be relatively low, the range data Laf may be directly calculated from the strength ratio R without calculating the corrected strength ratio RR.

Furthermore, in the above-described embodiment, when the corrected strength ratio RR is calculated from the strength ratio R, the previously prepared conversion table has been employed. Alternatively, the range data Laf may be obtained by such a different manner. That is, for instance, a pulse waveform of reflection light is subdivided into three waveform regions constructed of a rising time period Tup, a normal time period Tf1, and a falling time period Tdw; waveforms are stored for each of these waveform regions by being approximated by either a straight line or a curved line (polynomial, index number, logarithm etc.); the strength ratio R calculated from the pixel output values V1 and V2, and a delay time T of the reflection light are calculated which is made coincident with the calculation of strength ratios involving the three stored waveform regions; and then, the range data laf may be calculated by employing this calculated delay time T.

Also, in the above-explained embodiment, only the range image is produced. Alternatively, the range image producing apparatus 1 may be arranged by that normal image data may also be acquired by setting the pulse widths of the exposure signals SH1 and SH2 sufficiently longer than the first and second correction periods, and also the first and second exposure periods, and then only the background light is received without irradiating the pulse light.

In this alternative case, the capacitors 85 and 86 may be used at the same time in order to acquire one sheet of image data. In other words, since these two capacitors 85 and 86 are used as a single capacitor having a twice-higher capacitance, the saturation storage capacity of the capacitor is increased, so that such a scene having high brightness can be imaged. Also, in the case that these two capacitors 85 and 86 are separately used in order to acquire two sheets of image data, it is possible to acquire such continuous image data having a very short time difference.

Further, in the above-explained embodiment, the range data Laf is acquired based upon the received light amounts obtained in the first and second exposure periods with respect to one pulse light irradiation. Alternatively, in the case that a light reception strength is very small, the range data Laf may be obtained by multiplying light reception amounts Q1 and Q2 which are acquired during plural pulse light irradiation.

The above disclosure has the following aspects.

According to a first aspect of the present disclosure, a method for producing a range data includes: irradiating a pulse light toward an object during a first time period, which is a time for the pulse light to travel back and forth to a predetermined maximum measurement distance; receiving a reflected pulse light reflected by the object during the first time period and a second time period, wherein the second time period starts at an end of the first time period, and wherein the second time period is equal to or longer than the first time period; calculating a ratio between a first received light amount and a total received light amount or a ratio between a second received light amount and the total received light amount, wherein the first received light amount is a light amount of the reflected pulse light received during the first time period, wherein the second received light amount is a light amount of the reflected pulse light received during the second time period, and wherein the total received light amount is a sum of the first received light amount and the second received light amount; and producing the range data based on the ratio between the first received light amount and the total received light amount or the ratio between the second received light amount and the total received light amount, wherein the range data represents a distance to the object.

When the object is disposed within the maximum measurement distance, the pulse light is reflected by the object, and the reflected pulse light is received during the first and second time periods. The first and second received light amounts relate to the distance to the object and reflection coefficient of the object. When the distance to the object is zero meter, the ratio between the second received light amount and the total received light amount is zero if the pulse light has an ideal rectangular waveform. When the distance to the object is the maximum measurement distance, the ratio is one. When the distance to the object is the maximum measurement distance multiplied by $\alpha$ ($0<\alpha<1$), the ratio is $\alpha$. When the distance to the object is zero meter, the ratio between the first received light amount and the total received light amount is zero if the pulse light has an ideal rectangular waveform. When the distance to the object is the maximum measurement distance, the ratio is one. When the distance to the object is the maximum measurement distance multiplied by $\alpha$ ($0<\alpha<1$), the ratio is $1-\alpha$. Here, the ratio does not depend on the reflection coefficient of the object, so that the range data to the object is accurately obtained. Thus, in the above device, the range data is easily obtained within short time, i.e., a real time. Accordingly, even when the object is a moving object, the range data is accurately obtained. Further, only by extending the first and second time periods, the maximum measurement distance can be easily increased. Furthermore, only by increasing detection accuracy of the reflected pulse light, distance resolution is improved without increasing the measurement time.

Alternatively, the above method may repeat multiple times (e.g., N times). In this case, the first received light amount is accumulated multiple times, and the second received light amount is accumulated multiple times. This multiple sampling is different from a multiple sampling (e.g., M times) for increasing resolution according to a conventional method. Specifically, in the conventional method, it is necessary to perform M multiplied by N times sampling. Thus, the above method can reduce the number of times, so that the measurement time of the above method is one-Mth of that of the conventional method.

According to a second aspect of the present disclosure, a range image producing apparatus includes: a light emitting element for irradiating a pulse light toward a predetermined measurement range; an imaging device including a plurality of unit sensors, which are arranged in a two-dimensional plane, wherein each unit sensor includes a charge storage type photo electric conversion element for receiving a reflected pulse light reflected by an object and for converting the reflected pulse light to an electric charge, a first storage element for accumulating an output of the photo electric conversion element as a first pixel data and a second storage element for accumulating the output of the photo electric conversion element as a second pixel data; a controller, wherein the controller initializes the first and second storage elements to be a predetermined initial voltage, respectively, wherein the controller controls the light emitting element in such a manner that the light emitting element irradiates the pulse light during a first time period, which is a time for the pulse light to travel back and forth to a predetermined maximum measurement distance, wherein the controller controls the first storage element in such a manner that the first storage element accumulates the output of the photo electric conversion element during the first time period, and wherein the controller controls the second storage element in such a manner that the second storage element accumulates the output of the photo electric conversion element during a second time period, which starts at an end of the first time period and is equal to or longer than the first time period; and a range data producing element for producing a range data, which represents a distance between the object and the apparatus, wherein the range data is produced based on a ratio between the first pixel data and a total pixel data or a ratio between the second pixel data and the total pixel data, wherein the total pixel data is a sum of the first pixel data and the second pixel data. The range data producing element produces a range image having a pixel data of the range data. The above apparatus can detect the range data accurately and within short time. Further, the apparatus can detect the distance to the moving object accurately. Furthermore, the apparatus has high distance resolution. Since it is not required for the above apparatus to control a process time with high precision, the construction of the imaging device and the controller can be simplified.

Alternatively, the range data producing element may produce the range data in such a manner that the range data is obtained by multiplying the ratio between the first pixel data and the total pixel data or the ratio between the second pixel data and the total pixel data by the maximum measurement distance.

Alternatively, the range data producing element may compensate the first pixel data, the second pixel data, the ratio between the first pixel data and the total pixel data, the ratio between the second pixel data and the total pixel data or the range data. Compensation of the range data producing element is performed in such a manner that an error of waveform distortion of the pulse light is compensated based on waveform information of the pulse light. The waveform distortion is occurred at a rising edge or at a decaying edge of the pulse light, and the waveform information is obtained in such a manner that the pulse light is preliminarily measured by the photo electric conversion element. In this case, the range data is compensated to have a linear relationship to the actual distance to the object. Thus, on the basis of the compensated range data, the distance to the object is easily and accurately obtained. Here, the actual pulse light has a rising edge and a decaying edge, so that the actual pulse light does not have the ideal rectangular waveform. This is because a light emitting element such as a light emitting diode and a laser diode as a light source of the pulse light has a parasitic capacitance, and a driving element such as a transistor and a FET for driving the light emitting element has limitation of driving performance. Accordingly, when the first and second received light amounts are directly used for calculating the distance to the object, the ratio and the distance to the object have non-linear relationship. Thus, the above compensation is necessitated to obtain the distance to the object accurately.

Alternatively, the controller may control the first storage element in such a manner that the first storage element accumulates the output of the photo electric conversion element during a first compensation time period, the output having a polarity opposite to that during the first time period so that the first storage element accumulates a background output corresponding to a background light, and the controller may control the second storage element in such a manner that the second storage element accumulates the output of the photo electric conversion element during a second compensation time period, the output having a polarity opposite to that during the second time period so that the second storage element accumulates the background output. The first compensation time period has time amount equal to that of the first time period, and the first compensation time period is disposed outside of the first and second time periods, and the second compensation time period has time amount equal to that of the second time period, and the second compensation time period is disposed outside of the first and second time periods. In this case, the charge corresponding to the background light accumulated during the first and second compensation time periods is removed from the charge corresponding to the received pulse light and the background light accumulated during the first and second time periods. Thus, the first and second pixel data do not include the error caused by the background light. Thus, the range data is obtained with high accuracy, so that the range image has the high accuracy. Here, in a conventional method for removing the error caused by the background light, a DC component in the output of the photo electric conversion element is removed from the output of the photo electric conversion element by using a AC coupling capacitor. However, in this conventional method, the AC coupling capacitor has a large capacitance, so that the dimensions of the unit sensor become large. However, in the above apparatus without the AC coupling capacitor, the dimensions of the apparatus are comparatively small. Further, since the apparatus has no AC coupling capacitor, the apparatus can detect not only the range image but also a normal image.

Alternatively, the first time period of one of the unit sensors may be different from that of another one of the unit sensors, and the second time period of one of the unit sensors may be different from that of another one of the unit sensors. Further, the imaging device may further include a plurality of sensor groups, each of which includes predetermined unit sensors. The first time period of each unit sensor in one of sensor groups is different from that in another one of sensor groups, and the second time period of each unit sensor in the one of sensor groups is different from that in the another one of sensor groups.

According to a third aspect of the present disclosure, a photoelectric sensor includes: a plurality of unit sensors, which are arranged in a two-dimensional plane. Each unit sensor includes: a charge storage type photo electric conversion element for receiving a light and for converting the light to an electric charge; a first storage element for accumulating an output of the photo electric conversion element; a second storage element for accumulating the output of the photo electric conversion element; a current path for flowing the output of the photo electric conversion element; a connector for connecting the current path and the first or second storage element; and a charging/discharging switch for switching a flowing direction of a current in the current path to the photo electric conversion element. In the sensor, one of the first and second storage elements is selected, so that the one of the first and second storage elements is charged and/or discharged by using the output of the photo electric conversion element.

Further, both of the first and second storage elements are selected, so that both of the first and second storage elements are charged and/or discharged by using the output of the photo electric conversion element. This sensor is suitably used for the range image producing apparatus having high accuracy of the range image. Further, when the normal image is obtained, both of the first and second storage elements are selected so that the first and second storage elements provide one storage element.

Alternatively, the photo electric conversion element may be a photo diode having a PIN construction. The PIN type photo diode is formed by a conventional CMOS process. Thus, a manufacturing cost of the photo diode is comparatively small. Further, the PIN type photo diode has high sensitivity because the insulation layer for receiving the light has large thickness.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A range image producing apparatus comprising:
a light emitting element for irradiating a pulse light toward a predetermined measurement range;
an imaging device including a plurality of unit sensors, which are arranged in a two-dimensional plane, wherein each unit sensor includes a charge storage type photo electric conversion element for receiving a reflected pulse light reflected by an object and for converting the reflected pulse light to an electric charge, a first storage element for accumulating au output of the photo electric conversion element as a first pixel data and a second storage element for accumulating the output of the photo electric conversion element as a second pixel data;
a controller, wherein the controller initializes the first and second storage elements to be a predetermined initial voltage, respectively, wherein the controller controls the light emitting element in such a manner that the light emitting element irradiates the pulse light during a first time period, which is a time for the pulse light to travel back and forth to a predetermined maximum measurement distance, wherein the controller controls the first storage element in such a manner that the first storage element accumulates the output of the photo electric conversion element during the first time period, and wherein the controller controls the second storage element in such a manner that the second storage element accumulates the output of the photo electric conversion element during a second time period, which starts at an end of the first time period and is equal to or longer than the first time period; and
a range data producing element for producing a range data, which represents a distance between the object and the apparatus, wherein the range data is produced based on a ratio between the first pixel data and a total pixel data or a ratio between the second pixel data and the total pixel data, wherein the total pixel data is a sum of the first pixel data and the second pixel data, wherein
the range data producing element produces a range image having a pixel data of the range data,
wherein the range data producing element produces the range image in such a manner that the range image is obtained by multiplying the ratio between the first pixel data and the total pixel data or the ratio between the second pixel data and the total pixel data by the maximum measurement distance.

2. The apparatus according to claim 1, wherein
the range data producing element compensates the first pixel data, the second pixel data, the ratio between the first pixel data and the total pixel data, the ratio between the second pixel data and the total pixel data, or the range data,
compensation of the range data producing element is performed in such a manner that an error of waveform distortion of the pulse light is compensated based on waveform information of the pulse light,
the waveform distortion is occurred at a rising edge or at a decaying edge of the pulse light, and
the waveform information is obtained in such a manner that the pulse light is preliminarily measured by the photo electric conversion element.

3. The apparatus according to claim 1, wherein
the controller controls the first storage element in such a manner that the first storage element accumulates the output of the photo electric conversion element during a first compensation time period, the output having a polarity opposite to that during the first time period so that the first storage element accumulates a background output corresponding to a background light,
the controller controls the second storage element in such a manner that the second storage element accumulates the output of the photo electric conversion element during a second compensation time period, the output having a polarity opposite to that during the second time period so that the second storage element accumulates the background output,
the first compensation time period has time amount equal to that of the first time period, and the first compensation time period is disposed outside of the first and second time periods, and
the second compensation time period has time amount equal to that of the second time period, and the second compensation time period is disposed outside of the first and second time periods.

4. The apparatus according to claim 1, wherein
the first time period of one of the unit sensors is different from that of another one of the unit sensors, and
the second time period of one of the unit sensors is different from that of another one of the unit sensors.

5. The apparatus according to claim 1, wherein
the imaging device further includes a plurality of sensor groups, each of which includes predetermined unit sensors,
the first time period of each unit sensor in one of sensor groups is different from that in another one of sensor groups, and
the second time period of each unit sensor in the one of sensor groups is different from that in the another one of sensor groups.

6. A photoelectric sensor comprising:
a plurality of unit sensors, which are arranged in a two-dimensional plane, wherein each unit sensor includes:
 a charge storage type photo electric conversion element for receiving a light and for converting the light to an electric charge;
 a first storage element for accumulating an output of the photo electric conversion element;
 a second storage element for accumulating the output of the photo electric conversion element;
 a current path for flowing the output of the photo electric conversion element;
 a connector for connecting the current path and the first or second storage element; and
 a charging/discharging switch for switching a flowing direction of a current in the current path between the photo electric conversion element and at least one of the first and second storage elements so that the flowing direction is reversed, and the at least one of the first and second storage elements respectively charges and discharges the electric charge based on the output of the photo electric conversion element.

7. The sensor according to claim 6, wherein
the photo electric conversion element is a photo diode having a PIN construction.

8. The sensor according to claim 6, wherein
the at least one of the first and second storage element respectively charges the electric charge in such a manner that the current flows from the photo electric conversion element to the first or second storage element through the charging/discharging switch and the connector, and
the at least one of the first and second storage element respectively discharges the electric charge in such a manner that the current flows from the first or second storage element to the photo electric conversion element through the connector and the charging/discharging switch.

9. A range image producing apparatus comprising:
a light emitting element for irradiating a pulse light toward a predetermined measurement range;
an imaging device including a plurality of unit sensors, which are arranged in a two-dimensional plane, wherein each unit sensor includes a charge storage type photo electric conversion element for receiving a reflected pulse light reflected by an object and for converting the reflected pulse light to an electric charge, a first storage element for accumulating an output of the photo electric conversion element as a first pixel data and a second storage element for accumulating the output of the photo electric conversion element as a second pixel data;
a controller, wherein the controller initializes the first and second storage elements to be a predetermined initial voltage, respectively, wherein the controller controls the light emitting element in such a manner that the light emitting element irradiates the pulse light during a first time period, which is a time for the pulse light to travel back and forth to a predetermined maximum measurement distance, wherein the controller controls the first storage element in such a manner that the first storage element accumulates the output of the photo electric conversion element during the first time period, and wherein the controller controls the second storage element in such a manner that the second storage element accumulates the output of the photo electric conversion element during a second time period, which starts at an end of the first time period and is equal to or longer than the first time period; and
a range data producing element for producing range data, which represents a distance between the object and the apparatus, wherein th range data is produced based on a ratio between the first pixel data and a total pixel data or a ratio between the second pixel data and the total pixel data, wherein the total pixel data is a sum of the first pixel data and the second pixel data,
wherein the range data producing element produces a range image having a pixel data of the range data, wherein the first time period of one of the unit sensors is different from that of another one of the unit sensors, and wherein the second time period of one of the unit sensors is different from that of another one of the unit sensors.

10. A range image producing apparatus comprising:

a light emitting element for irradiating a pulse light toward a predetermined measurement range;

an imaging device including a plurality of unit sensors, which are arranged in a two-dimensional plane, wherein each unit sensor includes a charge storage type photo electric conversion element for receiving a reflected pulse light reflected by an object and for converting the reflected pulse light to an electric charge, a first storage element for accumulating an output of the photo electric conversion element as a first pixel data and a second storage element fot accumulating the output of the photo electric conversion element as a second pixel data;

a controller, wherein the controller initializes the first and second storage elements to be a predetermined initial voltage, respectively, wherein the controller controls the light emitting element in such a manner that the light emitting element irradiates the pulse light during a first time period, which is a time for the pulse light to travel back and forth to a predetermined maximum measurement distance, wherein the controller controls the first storage element in such a manner that the first storage element accumulates the output of the photo electric conversion element during the first time period, and wherein the controller controls the second storage element in such a manner that the second storage element accumulates the output of the photo electric conversion element during a second time period, which starts at an end of the first time period and is equal to or longer than the first time period; and a range data producing element for producing range data, which represents a distance between the object and the apparatus, wherein the range data is produced based on a ratio between the first pixel data and a total pixel data or a ratio between the second pixel data and the total pixel data, wherein the total pixel data is a sum of the first pixel data and the second pixel data, wherein the range data producing element produces a range image having a pixel data of the range data, wherein the imaging device further includes a plurality of sensor groups, each of which includes predetermined unit sensors, wherein the first time period of each unit sensor in one of sensor groups is different from that in another one of sensor groups, and wherein the second time period of each unit sensor in the one of sensor groups is different from that in the another one of sensor groups.

* * * * *